US008544736B2

(12) United States Patent
Connell, II et al.

(10) Patent No.: US 8,544,736 B2
(45) Date of Patent: Oct. 1, 2013

(54) ITEM SCANNING SYSTEM

(75) Inventors: Jonathan H. Connell, II, Cortlandt-Manor, NY (US); Arun Hampapur, Norwalk, CT (US); Sharathchandra U. Pankanti, Manhasset, NY (US); Andrew W. Senior, New York, NY (US); Craig Velliquette, Springdale, AR (US)

(73) Assignee: International Business Machines Corporation, Armonk, NY (US)

( * ) Notice: Subject to any disclaimer, the term of this patent is extended or adjusted under 35 U.S.C. 154(b) by 1389 days.

(21) Appl. No.: 11/782,173

(22) Filed: Jul. 24, 2007

(65) Prior Publication Data

US 2009/0026269 A1 Jan. 29, 2009

(51) Int. Cl.
*G06K 15/00* (2006.01)
(52) U.S. Cl.
USPC ...... 235/383; 235/375; 235/385; 235/462.01; 235/462.14
(58) Field of Classification Search
USPC ............... 235/383, 385, 375, 462.01, 462.14
See application file for complete search history.

(56) References Cited

U.S. PATENT DOCUMENTS

| 4,323,772 A | 4/1982 | Serge |
| 5,331,455 A | 7/1994 | Chang |
| 5,467,403 A | 11/1995 | Fishbine et al. |
| 5,477,379 A | 12/1995 | Chang |
| 5,513,264 A | 4/1996 | Wang et al. |
| 5,583,686 A | 12/1996 | Chen |
| 5,609,223 A | 3/1997 | Iizaka et al. |
| 5,631,976 A | 5/1997 | Bolle et al. |
| 5,635,697 A | 6/1997 | Shellhammer et al. |
| 5,659,167 A | 8/1997 | Wang et al. |
| 5,763,864 A | 6/1998 | O'Hagan et al. |
| 5,811,774 A | 9/1998 | Ju et al. |
| 5,815,200 A | 9/1998 | Ju et al. |
| 5,918,211 A | 6/1999 | Sloane |
| 6,032,128 A | 2/2000 | Morrison et al. |
| 6,064,469 A | 5/2000 | Brownstein |
| 6,122,409 A | 9/2000 | Boggs et al. |
| 6,287,299 B1 | 9/2001 | Sasnett et al. |
| 6,382,357 B1 | 5/2002 | Morrison et al. |

(Continued)

OTHER PUBLICATIONS

Int Business Machine Corp[IBMC]; Web based ordering system for non-standardised goods e.g. fruit, vegetables provides view of item for selection and prints bar code on item for order processing; 1998RD-411124 (Jun. 20, 1998); RD 411124 A; Jul. 10, 1998 EN.*

(Continued)

*Primary Examiner* — Tuyen K Vo
(74) *Attorney, Agent, or Firm* — Matthew Chung; Hoffman Warnick LLC (57) ABSTRACT

The present invention provides an item scanning system in which an appearance of an item is received (e.g., at checkout). The appearance is captured with an image capture device (e.g., still frame camera, video camera, etc.) that can be collocated with a barcode scanner. In being collocated, the image capture device can be positioned proximate (e.g., near, attached to, etc.) the bar code scanner, integrated within a common housing/unit with the barcode scanner, etc. In any event, a search engine will then search a database of items based on the appearance to identify a set of items that potentially match the item. When one of the set of items is selected (e.g., by the checkout clerk), the selection will be received and stored for future investigation/auditing.

20 Claims, 4 Drawing Sheets

(56) References Cited

U.S. PATENT DOCUMENTS

| | | |
|---|---|---|
| 6,434,530 B1 | 8/2002 | Sloane et al. |
| 6,457,644 B1 | 10/2002 | Collins, Jr. et al. |
| 6,504,481 B2 | 1/2003 | Teller |
| 6,556,276 B2 | 4/2003 | Staeheli et al. |
| 6,592,033 B2 | 7/2003 | Jennings et al. |
| 6,606,171 B1 | 8/2003 | Renk et al. |
| 6,853,400 B1 | 2/2005 | Matama |
| 6,991,158 B2 | 1/2006 | Munte |
| 7,044,370 B2 | 5/2006 | Bellis et al. |
| 7,118,026 B2 | 10/2006 | Harris et al. |
| 7,124,058 B2 | 10/2006 | Namaky et al. |
| 7,143,065 B1 | 11/2006 | Enright |
| 7,159,770 B2 | 1/2007 | Onozu |
| 7,196,624 B2 | 3/2007 | Teller |
| 7,202,780 B2 | 4/2007 | Teller |
| 7,219,838 B2 | 5/2007 | Brewster et al. |
| 7,334,729 B2 * | 2/2008 | Brewington ............... 235/383 |
| 7,337,962 B2 | 3/2008 | Do et al. |
| 7,398,923 B2 | 7/2008 | Do et al. |
| 7,422,147 B2 | 9/2008 | Rosenbaum |
| 7,909,248 B1 | 3/2011 | Goncalves |
| 2001/0045463 A1 | 11/2001 | Madding et al. |
| 2002/0004404 A1 | 1/2002 | Squibbs |
| 2002/0070861 A1 | 6/2002 | Teller |
| 2002/0110374 A1 | 8/2002 | Staeheli et al. |
| 2002/0121547 A1 | 9/2002 | Wieth et al. |
| 2002/0161658 A1 | 10/2002 | Sussman |
| 2002/0194074 A1 * | 12/2002 | Jacobs ......................... 705/16 |
| 2003/0071725 A1 | 4/2003 | Teller |
| 2003/0222147 A1 | 12/2003 | Havens et al. |
| 2004/0125396 A1 | 7/2004 | Burke |
| 2004/0262391 A1 | 12/2004 | Harris et al. |
| 2005/0096855 A1 | 5/2005 | Teller |
| 2005/0173527 A1 * | 8/2005 | Conzola ...................... 235/385 |
| 2005/0189411 A1 * | 9/2005 | Ostrowski et al. ............ 235/383 |
| 2005/0189412 A1 | 9/2005 | Hudnut et al. |
| 2005/0200490 A1 | 9/2005 | Teller |
| 2005/0211771 A1 | 9/2005 | Onozu |
| 2005/0237213 A1 | 10/2005 | Teller |
| 2005/0240478 A1 | 10/2005 | Lubow et al. |
| 2006/0010033 A1 | 1/2006 | Thomas |
| 2006/0022051 A1 | 2/2006 | Patel et al. |
| 2006/0047835 A1 | 3/2006 | Greaux |
| 2006/0161390 A1 | 7/2006 | Namaky et al. |
| 2006/0179164 A1 | 8/2006 | Katibian et al. |
| 2006/0180664 A1 | 8/2006 | Barrett et al. |
| 2006/0288133 A1 | 12/2006 | Katibian et al. |
| 2006/0289637 A1 | 12/2006 | Brice et al. |
| 2006/0290980 A1 | 12/2006 | Terada |
| 2007/0094080 A1 | 4/2007 | Wiken |
| 2007/0107016 A1 | 5/2007 | Angel et al. |
| 2007/0107017 A1 | 5/2007 | Angel et al. |
| 2007/0107021 A1 | 5/2007 | Angel et al. |
| 2007/0158417 A1 | 7/2007 | Brewington |
| 2007/0279244 A1 * | 12/2007 | Haughawout et al. ... 340/825.22 |
| 2007/0288310 A1 | 12/2007 | Boos et al. |
| 2008/0027796 A1 * | 1/2008 | Chaves ......................... 705/14 |
| 2008/0059281 A1 * | 3/2008 | Tower et al. .................. 705/10 |
| 2008/0142598 A1 | 6/2008 | Kwan |
| 2008/0149725 A1 | 6/2008 | Rosenbaum |
| 2008/0154727 A1 | 6/2008 | Carlson |
| 2008/0226129 A1 | 9/2008 | Kundu et al. |
| 2009/0119168 A1 | 5/2009 | Otto et al. |
| 2009/0268941 A1 | 10/2009 | French et al. |
| 2010/0042236 A1 | 2/2010 | Chow |
| 2011/0060634 A1 | 3/2011 | Grossman et al. |
| 2011/0215147 A1 | 9/2011 | Goncalves |
| 2012/0030003 A1 | 2/2012 | Herwig |
| 2012/0101881 A1 | 4/2012 | Taylor et al. |
| 2013/0001295 A1 | 1/2013 | Goncalves |

OTHER PUBLICATIONS

Bolle et al., "VeggieVision: A Produce Recognition System", pp. 1-4, WACV 1996.

Vo, U.S. Appl. No. 12/037,266, Office Action Communication, Nov. 17, 2011, 12 pages.

Basit, U.S. Appl. No. 12/037,270, Office Action Communication, Nov. 17, 2011, 21 pages.

Seth, U.S. Appl. No. 12/111,652, Office Action Communication, Dec. 1, 2011, 43 pages.

Vo, U.S. Appl. No. 12/037,266, Office Action Communication, Jan. 27, 2011, 31 pages.

Basit, U.S. Appl. No. 12/037,270, Office Action Communication, Jan. 21, 2011, 13 pages.

Johnson, U.S. Appl. No. 12/052,051, Office Action Communication, Dec. 23, 2010, 31 pages.

"Web based ordering system for non-standarised goods e.g. fruit, vegetables provides view of item for selection and prints bar code on item for order processing", IBM Corporation, Jul. 10, 1998, 2 pages, abstract.

Vo, U.S. Appl. No. 12/037,266, Office Action Communication, Feb. 6, 2013, 14 pages.

Stanford, U.S. Appl. No. 11/782,177, Office Action Communication, Feb. 28, 2012, 31 pages.

Vo, U.S. Appl. No. 12/037,266, Office Action Communication, Mar. 9, 2012, 13 pages.

Stanford, U.S. Appl. No. 11/756,391, Office Action Communication, Mar. 12, 2012, 29 pages.

Seth, U.S. Appl. No. 12/111,652, Notice of Allowance & Fees Due, Mar. 14, 2012, 7 pages.

Kim, U.S. Appl. No. 11/756,382, Notice of Allowance & Fees Due, Mar. 24, 2011, 11 pages.

Stanford, U.S. Appl. No. 12/112,318, Office Action Communication, May 3, 2011, 16 pages.

Stanford, U.S. Appl. No. 11/782,177, Office Action Communication, Jun. 19, 2012, 16 pages.

Connell II, et al., U.S. Appl. No. 11/782,177, Final Office Action, Apr. 23, 2010, 18 pages.

Connell II, et al., U.S. Appl. No. 12/052,046, Office Action, Apr. 2, 2010, 13 pages.

Connell II, et al., U.S. Appl. No. 11/756,391, Final Office Action, May 6, 2010, 18 pages.

Connell II, et al., U.S. Appl. No. 12/052,051, Office Action, Jun. 11, 2010, 13 pages.

Basit, U.S. Appl. No. 12/037,270, Office Action Communication, Jun. 15, 2011, 22 pages.

Mehta, "Delta Adds Fee to Tickets Not Bought Online; Airlines: The $2 charge applies to all round-trip domestic flights not booked through its Web site. Travel agens criticize the move." Los Angeles Times, Jan 14, 1999, ProQuest LLC, 3 pages.

Johnson, U.S. Appl. No. 12/052,051, Notice of Allowance & Fees Due, Jul. 14, 2011, 20 pages.

Rankins, U.S. Appl. No. 12/037,270, Notice of Allowance & Fees Due, 18 pages, Jul. 16, 2012.

Vo, U.S. App. No. 12/037,266, Office Action Communication, Jul. 17, 2012, 14 pages.

Vo, U.S. Appl. No. 12/037,266, Office Action Communication, Jul. 22, 2011, 18 pages.

Stanford, U.S. Appl. No. 11/756,391, Office Action Communication, Aug. 15, 2012, 20 pages.

Hai, U.S. Appl. No. 12/037,270, Office Action Communication, Aug. 6, 2010, 19 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

Crosland, U.S. Appl. No. 12/052,046, Notice of Allowance & Fees Due, Oct. 7, 2010, 14 pages.

Stanford, U.S. Appl. No. 11/756,391, Office Action Communication, G511354USAA, Jun. 14, 2013, 22 pages.

Vo, U.S. Appl. No. 12/037,266, Office Action Communication, G511299USAA, Jun. 14, 2013, 14 pages.

Stanford, U.S. Appl. No. 11/782,177, Office Action Communication, END920070220US1, Jun. 14, 2013, 25 pages.

* cited by examiner

ITEM SCANNING SYSTEM

CROSS-REFERENCE TO RELATED APPLICATIONS

This application is related in some aspects to the commonly owned and application entitled "Smart scanning system," filed May 31, 2007, and which is assigned U.S. patent application Ser. No. 11/756,391, the entire contents of which are herein incorporated by reference. This application is also related in some aspects to the commonly owned and application entitled "Portable Device-Based Shopping Checkout," filed May 31, 2007, and which is assigned U.S. patent application Ser. No. 11/756,382, the entire contents of which are herein incorporated by reference. This application is also related in some aspects to the commonly owned application entitled "Secure checkout system," filed concurrently herewith, and which is assigned U.S. patent application Ser. No. 11/782,177, the entire contents of which are herein incorporated by reference.

FIELD OF THE INVENTION

Aspect of the present invention generally relate to item scanning. Specifically, an embodiment of the present invention provides a system that scans barcodes and identifies items based on their appearance.

BACKGROUND OF THE INVENTION

Marketplace security has become a rising concern over recent years. Security and anti-theft concerns have only increased with the pervasiveness of scanners at checkout stations. It has become increasingly frequent for perpetrators to switch and/or alter barcodes so that an item can be obtained for a cheaper price. In addition, many retailers also utilize image capture devices to catch shop lifters. Price scan at point of sale for (disputed) items without barcodes is a primary bottleneck for the checkout throughput. Typically, a missing barcode item is handed over to a sales associate who physically, goes to check a particular department for a similar item (with a barcode). Alternatively, a checkout clerk can manually input the name of the item if he/she knows it. Both options present an opportunity for mistake or fraud that may or may not involve the checkout clerk. For example, without a barcode scan, a store clerk may register the item incorrectly. When this happens, the transaction will likely be processed for an incorrect amount of money. This can even be done intentionally if there is some collusion between the checkout clerk and the "customer".

In view of the foregoing, there exists a need for a solution that solves at east one of the deficiencies in the related art.

SUMMARY OF THE INVENTION

In general, aspects of the present invention provide an item scanning system in which an appearance of an item is received (e.g., at checkout). The appearance is captured with an image capture device (e.g., still frame camera, video camera, etc.) that is collocated with a barcode scanner. In being collocated, the image capture device can be positioned proximate (e.g., near, attached to, etc.) the bar code scanner, integrated within a common housing/unit with the barcode scanner, etc. In any event, a search engine will search a database of items based on the appearance to identify a set of items that potentially match the item. When one of the set of items is selected (e.g., by the checkout clerk), the selection will be received and stored for future investigation/auditing. Thus, the teachings herein are especially helpful in preventing fraud or mistake during the checkout process. It should be understood that in addition to an appearance-based search, the database of items could be searched based on at least one of the following: a weight of the item, an approximate weight of the item, an approximate appearance of the item, approximate dimensions of the item, a description of the item, a functionality of the item, and/or a set of retail departments to which the item corresponds.

A first aspect of the present invention provides a method for scanning an item, comprising: receiving an appearance of the item at checkout as captured with an image capture device that is collocated with a barcode scanner; searching a database of items based on the appearance to identify a set of items that potentially match the item; and receiving and storing a selection of one of the set of items.

A second aspect of the present invention provides a system for scanning an item, comprising: a module for receiving an appearance of the item at checkout as captured with an image capture device; a module for searching a database of items based on the appearance to identify a set of items that potentially match the item; and a module for receiving and storing a selection of one of the set of items.

A third aspect of the present invention provides a program product stored on a computer readable medium for scanning an item, the computer readable medium comprising program code for causing a computer system to: receive an appearance of the item at checkout as captured with an image capture device that is collocated with a barcode scanner; search a database of items based on the appearance to identify a set of items that potentially match the item; and receive and store a selection of one of the set of items.

A fourth aspect of the present invention provides a method for deploying a system for scanning an item, comprising: providing a computer infrastructure being operable to: receive an appearance of the item at checkout as captured with an image capture device that is collocated with a barcode scanner; search a database of items based on the appearance to identify a set of items that potentially match the item; and receive and store a selection of one of the set of items.

A fifth aspect of the present invention provides computer software embodied in a propagated signal for scanning an item, the computer software comprising instructions for causing a computer system to: receive an appearance of the item at checkout as captured with an image capture device that is collocated with a barcode scanner; search a database of items based on the appearance to identify a set of items that potentially match the item; and receive and store a selection of one of the set of items.

A sixth aspect of the present invention provides a data processing system for item scanning, comprising: a memory medium having instructions; a bus coupled to the memory medium; and a processor coupled to the bus that when executing the instructions causes the data processing system to: receive an appearance of the item at checkout as captured with an image capture device that is collocated with a barcode scanner; search a database of items based on the appearance to identify a set of items that potentially match the item; and receive and store a selection of one of the set of items.

A seventh aspect of the present invention provides a computer-implemented business method for scanning an item, comprising: receiving an appearance of the item at checkout as captured with an image capture device that is collocated with a barcode scanner; searching a database of items based on the appearance to identify a set of items that potentially match the item; and receiving and storing a selection of one of the set of items.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation I. General Description In general, aspects of the present invention provide an item scanning system in which an appearance of an item is received (e.g., at checkout). The appearance is captured with an image capture device (e.g., still frame camera, video camera, etc.) that can be collocated with a barcode scanner. In being collocated, the image capture device can be positioned proximate (e.g., near, attached to, etc.) the bar code scanner, integrated within a common housing/unit with the barcode scanner, etc. In any event, a search engine will then search a database of items based on the appearance to identify a set of items that potentially match the item. When one of the set of items is selected (e.g., by the checkout clerk), the selection will be received and stored for future investigation/auditing. Thus, the teachings herein are especially helpful in preventing and/or detecting fraud or mistake during the checkout process.

Figure 1:
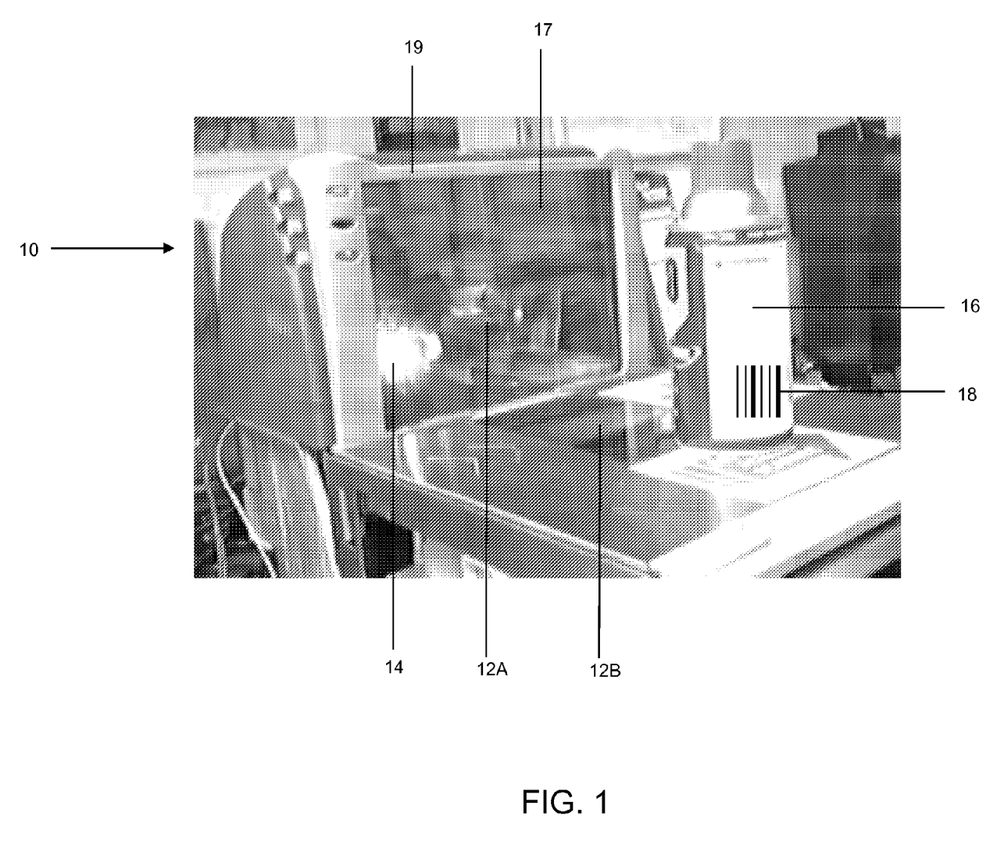
FIG. 1 depicts an item scanning system according to an embodiment of the present invention.

Referring now to FIG. 1, an item scanning system 10 according to one embodiment of the present invention is shown. In general, item scanning system 10 comprises an integrated scanning and image capture system. Specifically, item scanning system 10 includes at least one barcode scanner 12A and/or 12B, at least one image capture device(s) 14 (e.g., a still image camera, a video camera, etc.), and image scanning software (e.g., that can include barcode scanning and image processing software) (shown in FIG. 5). At least one barcode scanner 12A and one image capture mechanism 14 of item scanning system 10 are positioned within a common enclosure 19.

Image capture device(s) 14 is placed behind shield 17 (glass, plastic, etc.) as shown. Where multiple image capture devices 14 are used, one is placed so that it looks out along a path more or less normal to the vertical glass surface of the barcode scanner, and the other looks more or less straight up from below the horizontal surface of the scanner. The latter image capture device also can be placed off to one side, so that it is actually under the (e.g., steel) rim surrounding the existing shield 17 in that surface. As such, a hole (e.g., 1" in diameter in an illustrative embodiment) is cut in the steel rim, and covered with a separate, transparent plate. Regardless (as stated above), item scanning system 10 also includes barcode scanning and image processing software to perform the functions described herein. This software is stored on a memory medium that may or may not be positioned within enclosure.

Figure 2:
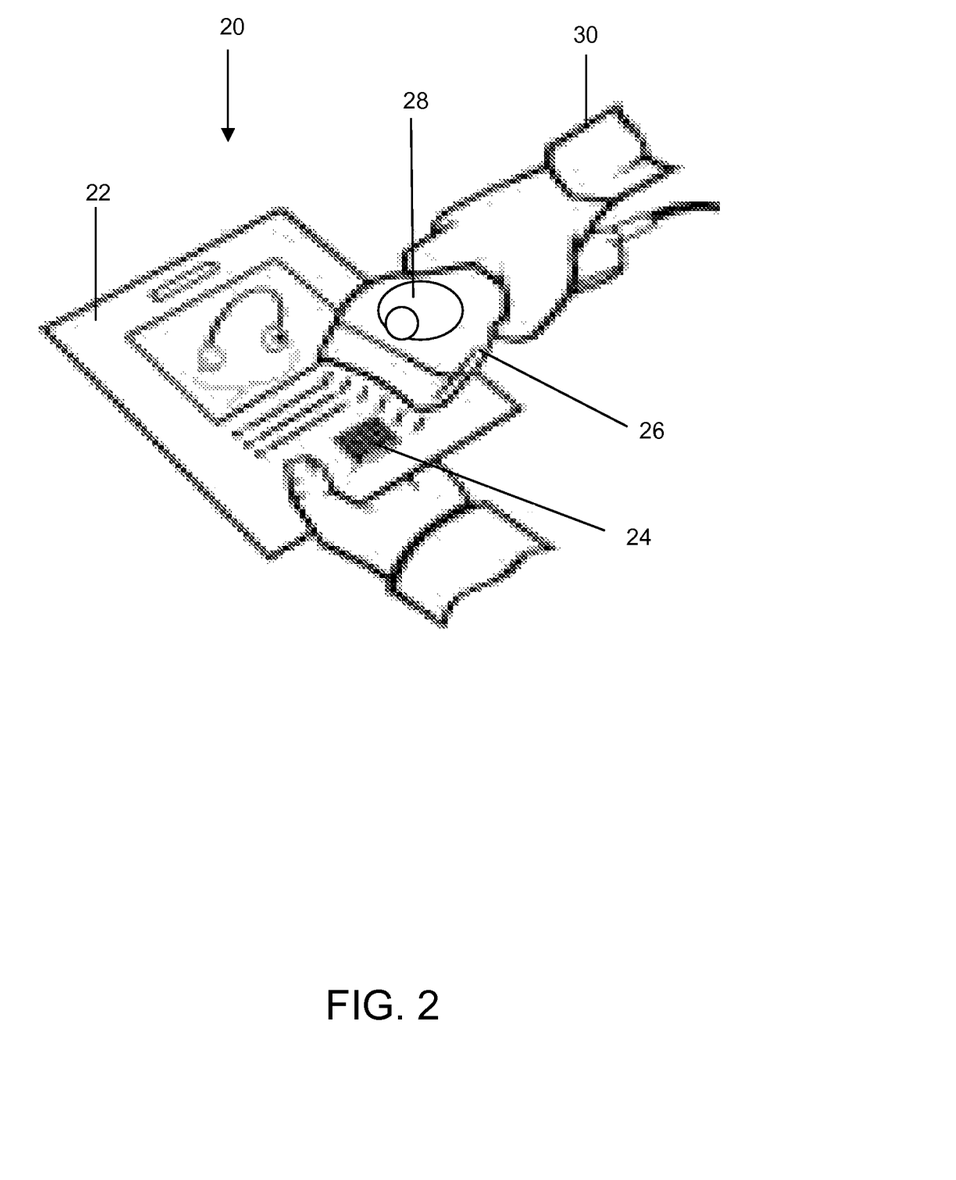
FIG. 2 depicts an item scanning system according to another embodiment of the present invention.

Referring now to FIG. 2, an item scanning system 20 according to another embodiment of the present invention is shown. In general, item scanning system 20 comprises handheld barcode scanner (hereinafter handheld scanner 26), at least one image capture device 28 (e.g., a still image camera, a video camera, etc.) that is collocated with handheld scanner 26, and image scanning software (shown in FIG. 5).

The functions of item scanning systems 10 and 20 are now explained in greater detail with reference to FIGS. 1 and 2 collectively. Specifically, when an item 16 and/or 22 is presented at checkout, a checkout clerk 30 will generally attempt to scan a barcode 18 and 24 of item 16 and 22. Whether or not barcode 18 and 24 is present, image capture device 14 and 28 will capture an appearance of item 16 and 22.

Figure 3:
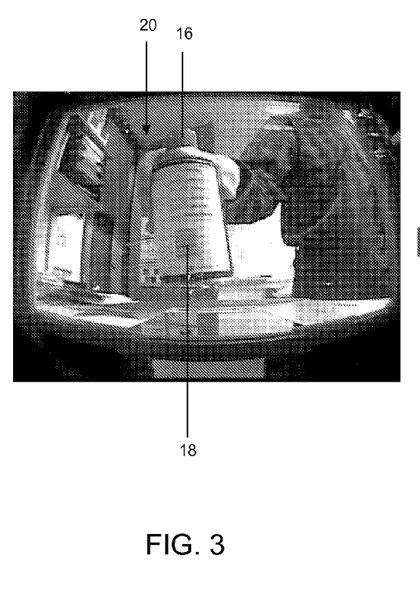
FIG. 3 depicts an item before being processed according to an embodiment of the present invention.
Figure 4:
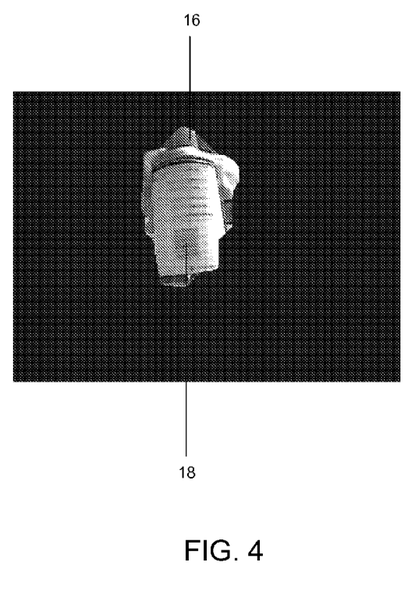
FIG. 4 depicts an item after being processed according to an embodiment of the present invention.

The sequence of capturing and processing the image is shown in FIGS. 3-4 with respect to item 16, and typically is as follows: wait for low motion of item 16; take dark and bright pictures; segment item 16 from background 20, the results of which are shown in FIG. 4; extract at least one visual feature of item 16 and determine the identity based on those visual features. This determination can be based on comparison of the image to an electronic database or library of images associated with corresponding item identities. In addition, the appearance can be as general or as specific as desired. For example, the appearance can be specific so as to identify the item (e.g., a bottle of X brand cola), or it can be more general (e.g., a bottle of cola, or just cola based on the color).

Thereafter, item scanning system 10 will (via a search engine) search a database of items to identify a set of items that potentially match the scanned item 16 and 22 based on the appearance (after processing as explained above). This search can be supplemented based on at least one of the following: a weight of the item, an approximate weight of the item, an approximate appearance of the item, approximate dimensions of the item, a description of the item, a functionality of the item, and a set of retail departments to which the item corresponds. These items can be determined automatically (e.g., by a scale), or can be manually input by checkout clerk 30 (FIG. 2). Regardless, when presented with the set of potentially matching items, checkout clerk 30 will select one of the items. This selection will be received and then stored/logged by the image scanning software for future analysis/audit.

It should be understood that the capturing of an image of an item can be performed whether or not a barcode is present. Whether or not a barcode is not present, the image capture and subsequent processing can be performed not only to identify an item without having to obtain a barcode, but also as a measure against fraud or mistake. Still yet, when a barcode is not present, the item scanning software can be configured to provide (e.g., print out) a barcode for checkout clerk 30.

II. Computerized Implementation

Figure 5:
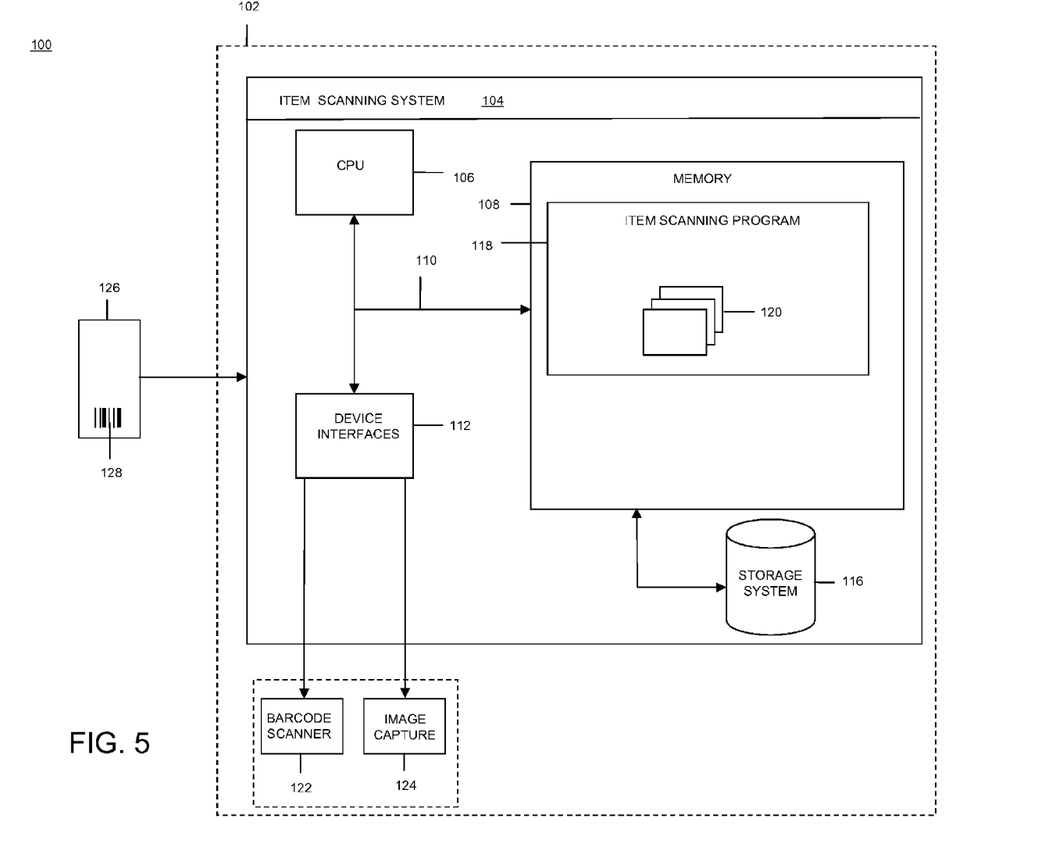
FIG. 5 depicts a more specific computerized implementation according to an embodiment of the present invention.

Referring now to FIG. 5, a computerized implementation 100 of the present invention is shown. As depicted, implementation 100 includes item scanning system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc., or on a standalone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, item scanning system 104 of implementation 100 includes a processing unit 106, a memory 108, a bus 110, and device interfaces 112. Further, implementation 100 is shown having barcode scanner 122 and image capture device 124, and storage system 116. Barcode scanner 122 and 124 can be positioned proximate one another as shown, attached to one another, and/or contained within a common as shown in phantom. In general, processing unit 106 executes computer program code, such as item scanning program 118 having modules 120 that provide the functionality described herein, which are stored in memory 108 and/or storage system 116. While executing computer program code, processing unit 106 can read and/or write data to/from memory 108, storage system 116, and/or device interfaces 112. Bus 110 provides a communication link between each of the components in item scanning system 104. Although not shown, item scanning system 104 could also include I/O interfaces that communicate with: one or more external devices such as a cash register, a keyboard, a pointing device, a display, etc.); one or more devices that enable a user to interact with item scanning system 104; and/or any devices (e.g., network card, modem, etc.) that enable item scanning system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, item scanning system 104 is only representative of various possible computer systems that can include numerous combinations of hardware. To this extent, in other embodiments, item scanning system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 5 can be included in item scanning system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into item scanning system 104.

Shown in memory 108 of item scanning system 104 is item scanning program 118, which includes a set (at least one) of modules 120. The modules generally provide the functions of the present invention as described herein. Specifically (among other things), set of modules 120 is configured to: receive an appearance of item 126 at checkout as captured with image capture device 124; search a database of items based on the appearance to identify a set of items that potentially match item 126; receive and store a selection of one of the set of items (e.g., as made by checkout clerk 30 of FIG. 2); accept input such as a weight of the item 126, an approximate weight of the item 126, an approximate appearance of the item 126, approximate dimensions of the item 126, a description of the item 126, a functionality of item 126, and/or a set of retail departments to which item 126 corresponds from device(s) or individual(s); use the input to further define the search of the database of item; and provide a barcode for item 126 based on the selection. If barcode 128 is present, item scanning system 120 is also configured to receive and process a scan of barcode 128 as made by barcode scanner 122. Upon determining an identity of item 126 based on the scan, item scanning system 120 can also determine whether the identity of item 126 is consistent with its appearance. If not, notification(s)/alert(s) can be provided.

While shown and described herein as an item scanning system, method, and program item, it is understood that aspects of the invention further provide various alternative embodiments. For example, in one embodiment, the invention provides a computer-readable/useable medium that includes computer program code to enable a computer infrastructure to provide item scanning. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide item scanning. In this case, the service provider can create, maintain, and support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for item scanning. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as item scanning system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or data processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for scanning an item, comprising:
receiving an appearance of the item at checkout as captured with an image capture device that is collocated with a barcode scanner, wherein the appearance is based on an image of the item captured by the image capture device as the item is presented for scanning by the barcode scanner;
searching a database of items based on the appearance to identify a set of items that potentially match the item; and
receiving and storing a selection of one of the set of items.

2. The method of claim 1, the selection being made by a checkout clerk.

3. The method of claim 1, the searching being further based on at least one of a weight of the item, an approximate weight of the item, an approximate appearance of the item, approximate dimensions of the item, a description of the item, a functionality of the item, or a set of retail departments to which the item corresponds.

4. The method of claim 1, further comprising providing a barcode for the item based on the selection.

5. The method of claim 1, further comprising capturing the image of the item using the image capture device as the item is presented for scanning by the barcode scanner.

6. A system for scanning an item, comprising:
a computing device including:
a module for receiving an appearance of the item at checkout as captured with an image capture device that is collocated with a barcode scanner, wherein the appearance is based on an image of the item captured by the image capture device as the item is presented for scanning by the barcode scanner;
a module for searching a database of items based on the appearance to identify a set of items that potentially match the item; and
a module for receiving and storing a selection of one of the set of items.

7. The system of claim 6, further comprising:
the image capture device; and
the barcode scanner, the computing device further including a module for operating the image capture device and the barcode scanner, wherein the module for operating causes the image capture device to capture the image of the item as the item is presented for scanning by the barcode scanner.

8. The system of claim 7, the image capture device being located immediately proximate to the barcode scanner.

9. The system of claim 7, the image capture device being contained within an integrated scanning and image capture system.

10. The system of claim 7, further comprising a second image capture device, wherein the module for operating further causes the second image capture device to capture a second image of the item as the item is presented for scanning by the barcode scanner, and wherein the appearance is further based on the second image of the item.

11. The system of claim 6, the selection being made by a checkout clerk.

12. The system of claim 6, the module for searching comprising a search engine.

13. The system of claim 12, the search engine further searching the database of items based on at least one of a weight of the item, an approximate weight of the item, an approximate appearance of the item, approximate dimensions of the item, a description of the item, a functionality of the item, or a set of retail departments to which the item corresponds.

14. The system of claim 6, the computing device further including a module for providing a barcode for the item based on the selection.

15. A program product stored on a computer readable storage medium for scanning an item, the computer readable medium comprising program code for causing a computer system to:
receive an appearance of the item at checkout as captured with an image capture device that is collocated with a barcode scanner, wherein the appearance is based on an image of the item captured by the image capture device as the item is presented for scanning by the barcode scanner;
search a database of items based on the appearance to identify a set of items that potentially match the item; and
receive and store a selection of one of the set of items.

16. The program product of claim 15, the selection being made by a checkout clerk.

17. The program product of claim 15, the computer readable medium further comprising program code for causing the computer system to further base the search on at least one of a weight of the item, an approximate weight of the item, an approximate appearance of the item, approximate dimensions of the item, a description of the item, a functionality of the item, or a set of retail departments to which the item corresponds.

18. The program product of claim 15, the computer readable medium further comprising program code for causing the computer system to provide a barcode for the item based on the selection.

19. The program product of claim 15, the computer readable medium further comprising program code for causing the computer system to capture the image of the item using the image capture device as the item is presented for scanning by the barcode scanner.

20. A method for deploying a system for scanning an item, comprising:
providing a computer infrastructure including a computing device being operable to:
receive an appearance of the item at checkout as captured with an image capture device that is collocated with a barcode scanner, wherein the appearance is based on an image of the item captured by the image capture device as the item is presented for scanning by the barcode scanner;
search a database of items based on the appearance to identify a set of items that potentially match the item; and
receive and store a selection of one of the set of items.

* * * * *